US006280087B1

United States Patent
Fabris

(10) Patent No.: US 6,280,087 B1
(45) Date of Patent: Aug. 28, 2001

(54) HYDROSTATIC BEARING FOR A STEEL MILL GUIDE

(76) Inventor: Mario Fabris, 188 N. Service Road, Grimsby, Ontario (CA), L3M 4E8

(*) Notice: Subject to any disclaimer, the term of this patent is extended or adjusted under 35 U.S.C. 154(b) by 0 days.

(21) Appl. No.: 09/427,015

(22) Filed: Oct. 25, 1999

(51) Int. Cl.$^7$ .................................................. F16C 13/00
(52) U.S. Cl. ............................ 384/56; 72/250; 384/373; 384/380; 384/418; 492/1
(58) Field of Search ...................... 384/12, 25, 46, 384/50, 53, 56, 58, 100, 110, 372, 373, 380, 396, 416, 417, 418; 72/227, 250, 257.5; 492/1; 193/37

(56) References Cited

U.S. PATENT DOCUMENTS

| 1,278,398 | * | 9/1918 | Thornton | 384/418 |
| 3,552,805 | * | 1/1971 | Dunlap | 384/55 |
| 4,039,107 | * | 8/1977 | Boley | 72/250 X |
| 4,373,367 | * | 2/1983 | Fabris | 72/250 |
| 4,562,976 | * | 1/1986 | Ban | 384/417 X |
| 4,876,875 | * | 10/1989 | Bruggeman et al. | 72/250 X |

\* cited by examiner

Primary Examiner—Thomas R. Hannon
(74) Attorney, Agent, or Firm—Edward H Oldham

(57) ABSTRACT

A guide for a high speed steel rolling mill comprises two rolling members, between which the work product passes mounted for rotation on a base member. Each roller has a frusto-conically shaped bearing recess formed therein and each guide roller is mounted on a mating, frusto-conically shaped projection which protrudes from the base member. Each of the projections has a central oil duct which serves to feed a lubricating oil under pressure into the frusto-conically shaped space between the roller and its mating projection. The lubricating oil serves to form a film between the stationary projection and the rotating guide roller. Because of the conically shaped mating surface, the lubricating oil tends to "lift" the guide roller from the surface of the supporting base. Each rolling member is provided with a vane structure to permit the rolling member to be prespun by the impingement of a cooling fluid on the vane surface thereof.

10 Claims, 2 Drawing Sheets

HYDROSTATIC BEARING FOR A STEEL MILL GUIDE

FIELD OF INVENTION

This invention relates to a guide for a steel mill wherein a pair of rotating rollers receive and guide a steel work product therebetween so that the work product is maintained in a predetermined orientation for the entry to the bite of the next set of processing rollers.

BACKGROUND OF THE INVENTION

Roller guide assemblies are required in order that the material being processed by the mill arrives at the next set of reducing rollers in the proper orientation and any unwanted twisting of the material being reduced is prevented. Because mill operators are constantly under pressure to increase the output of an operating mill, the speed at which the material undergoing reduction continues to increase. Thus, if a billet is passed through a multi-stage reducing mill at ever increasing speeds, the last set of reducing rollers and the associated mill guides must be capable of rotational speeds to match the speed of the material exiting from the last reducing rollers.

The rollers in the guide usually have a predetermined shape to assure that the previously shaped material is grasped between the opposing guide rollers in a specific orientation to assure that the moving material is passed into the bite of the next set of rollers in a specific orientation. The rollers are usually mounted on bearing assemblies to enable the rollers to continuously rotate at fairly high speeds while sustaining substantial thrust due to the pressing engagement with the moving material. Because the rollers must rotate in an environment which may be best described as hostile, any suggestion of a mill operation, wherein the throughput is to be substantially increased by increasing the speed of the material being reduced, will be met with resistance and cynicism by mill designers. Because the material being reduced is hot, the rollers must be cooled in some manner to obtain a satisfactory bearing life for the bearings in the roller. The lead end of the material being reduced, may at times, strike one of the guide rollers upon entry to the guide causing a permanent scar on the surface of the roller and simultaneously cause a spike load on the bearing elements themselves which may cause a shortening of the life of the bearing.

It would seem obvious that the designers of steel mills could extend the life of the various components of the mill especially the guide members by decreasing the loading on the guide rollers and their bearings by the utilization of larger more robust rollers mounted on suitable bearings. Of course this avenue is not available because of the limited space available for the guide in the space between the rollers of each reducing stage. Thus, it is necessary to keep the roller diameter within certain prescribed limits to mount the guide as close to the roller byte as possible.

SUMMARY OF THE INVENTION

The guide of this invention utilizes a pair of guide rollers fabricated of ceramic or other suitable material which are capable of rotational speeds previously deemed impossible. Each roller is provided with a grooved peripheral surface to engage the material passing therebetween in a positive manner so that the material is maintained in a preferred orientation for entrance to the next set of reducing rollers, and each roller is provided with a frusto-conically shaped cavity which extends along the axis of each roller.

The cavity is in communication with a central bore in each roller which extends through the roller. At the surface where the bore exits the roller, a tapered funnel shaped surface is provided for receiving a spherical ball.

Each roller is mounted in the guide so that the frusto-conically shaped cavity receives a correspondingly frusto-conically shaped projection which forms the basic bearing structure for the roller. The projection and cavity will operate to have a space formed therebetween to establish an oil film between the two surfaces. The projection is formed from a hard substance such as tungsten carbide. The projection is supplied with oil under pressure which is fed into the bearing film area by means of a co-axial bore in the frusto-conical projection which is in communication with the space between the roller and the projection.

Some oil also passes through a bore provided in each roller to provide some lubrication to the ball seated in the recess in the top surface of the roller. The roller assembly is held in an operating position by means of a removable housing (to permit roller replacement) which becomes part of the guide assembly.

The removable housing is supplied with a small bearing which controls the pressure of the spherical ball on its mating surface with the roller and thus, provides the restriction and pressure release for the pressurized oil in the roller-projection interface.

PRIOR ART

U.S. Pat. 4,373,367 Feb. 15, 1983

FIG. 3 of this patent illustrates the construction of the bearing system of a typical roller assembly of a prior art steel mill rolling guide. In it, a shaped roller is mounted on the outer races of a pair of spaced apart ball bearings. The inner races of the ball bearings are mounted on a massive bolt secured in the guide housing. This construction is typical of most roller guides in use today.

DESCRIPTION OF THE PREFERRED EMBODIMENT

Figure 1:
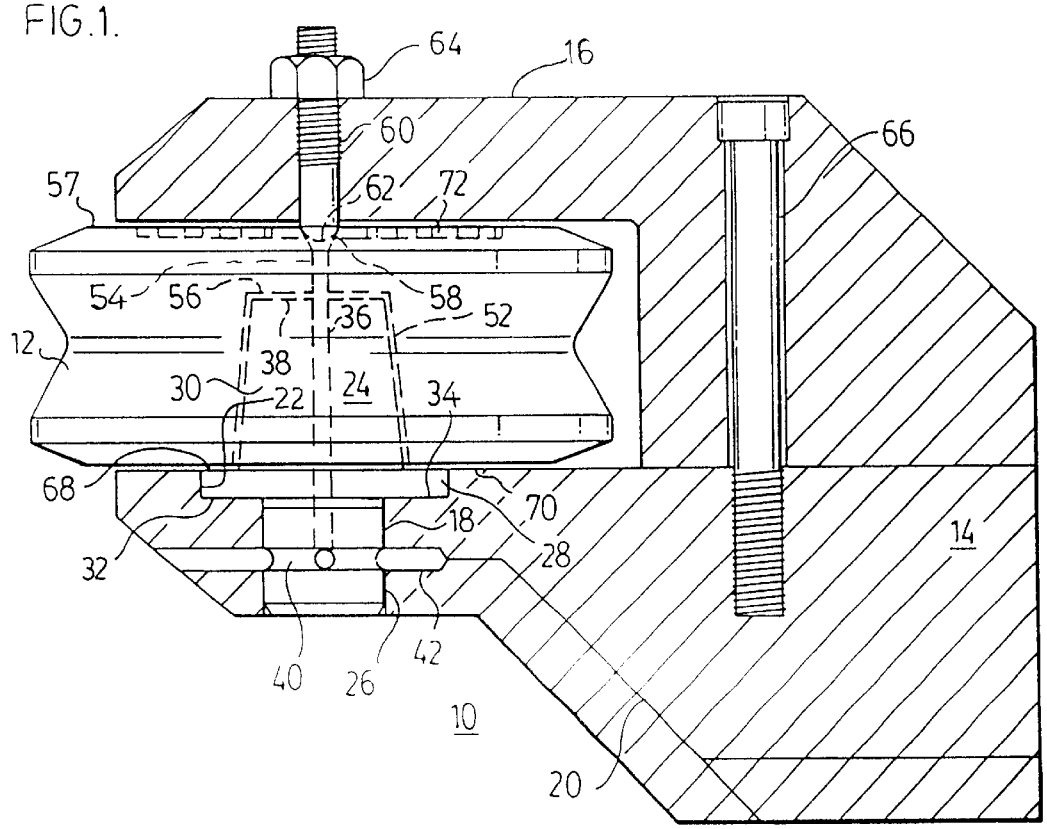
FIG. 1 is a partial sectional view of a portion of the guide of this invention.
Figure 2:
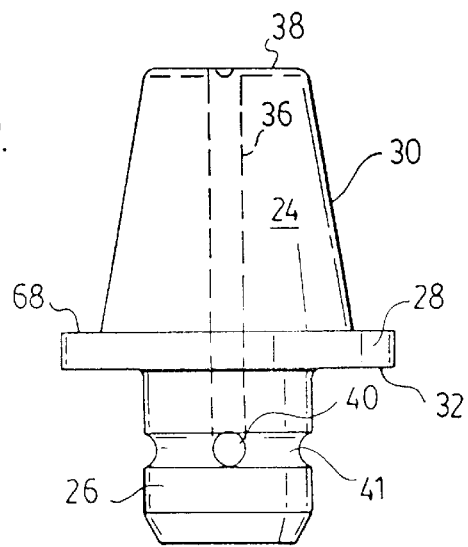
FIG. 2 is a view of the stationary post of the bearing of this invention.

FIG. 1 shows a partial view of a guide 10 which provides a housing for roller 12 to rotate. In this instance, guide 10 is shown having a base 14 which is shaped to be mounted on a guide deck (not shown) of a rolling stage of a steel mill.

A bearing cap 16 is fastened to base 14 to provide a suitable center of rotation for the top surface of roller 12.

Base 14 is provided with a bore 18 and an oil duct 20 which is in communication with bore 18. Bore 18 is provided with an annular recess 22 at the top surface of base 14.

A hollow bearing pin 24 is mounted in bore 18 to provide a bearing surface for roller 12. Pin 24 is fabricated from a very hard, tough material such as tungsten carbide and is shaped to have a cylindrical stub 26 which is received in base 12 so as to have an interference fit in bore 18.

The pin 24 has a projecting annular flange 28 which will be received in annular recess 22 of bore 18 in base 14 in an interference fit. The lower, surface 32 of annular projection 28 fits snugly against the upper surface 34 of recess 22.

The top portion 30 of bearing pin 24 has a frusto-conical shape which forms a bearing surface for roller 12. The cone angle for the top portion 30 is not critical and it has been found that an angle of about 10° is satisfactory. Angles which are much less than 10° do not provide sufficient hydrostatic lift for the roller 12 and angles much greater than 10° cause instability of the position of roller 12 during a rolling operation.

Pin 24 is hollow having a central bore 36 passing from the top surface 38 of pin 24 to a radial bore 40 in base 26 of pin 24. Radial bore 40 provides a pathway for the pressurized lubricating medium (usually an air oil mixture) which is fed into oil duct 42 in base 26 from duct 20 formed in base 14. The lubricant is thus forced into duct 20 and into groove 41 on pin 24 and through radial port 40 in stem 24 and thence up bore 36 where the lubricant spills over top surface 38 of pin 24.

Roller 12 is provided with a predetermined peripheral shape on the material engaging surfaces to guide the moving material in the correct orientation to the next succeeding pair of reduction rollers in the next station of a rolling mill.

Roller 12 has a central frusto-conically shaped recess 52 formed therein which is of a shape to fit over and mate with the frusto-conically shaped top portion 30 of pin 24. The mating of the top 30 of bearing pin 24 with the cavity in roller 12 is designed to leave a small clearance space therebetween for the lubricant pumped up to the surface 38 from bore 36. The lubricant thus forms a film between the wall of the cavity in roller 12 and the similarly shaped top portion 30 of pin 24. Roller 12 is provided with a bore 54 passing from surface 56 of roller 12 to conically shaped recess 58 in the top surface 57 of roller 12 so as to establish an oil communication passage therebetween.

An adjustable pin 60 is threaded into bearing cap 16 to mate with the top recess 58 of roller 24. Pin 60 has a spherically shaped end 62 which rests on recess 58 to control the escape of the pressurized lubricant in bore 54 of roller 12 and to provide a reference surface for the top position of roller 12 in guide 10.

Pin 60 is threaded into bearing cap 16 and is adjusted until the desired clearance is obtained between bearing pin 24 and the cavity within roller 12. Lock nut 64 is provided to maintain the position of pin 60 during operation of the roller 12 once the desired setting of pin 60 is obtained.

Cap 16 is attached to base 14 by means of bolts 66.

The guide rollers of this invention are thus mounted in the guide 10 on frusto-conical surfaces of the stationary bearing pins 24. Usually an air-oil mixture is fed into base 14 of guide 10 at passageway 20. The mixture then passes into ducts 42 and thence to radial bore holes 40 of pins 24. The pressurized air-oil mixture passes through duct 36 in each pin 24 and flows into the space between surfaces 38 of pin 24 and 56 of roller 12. Roller 12 is raised by the hydrostatic pressure of the air-oil mixture present between surfaces 38 and 56 so that conical recess 58 in roller 12 engages the spherical end 62 of pin 60. Roller 12 may now rotate as the pressurized air-oil mixture is fed into the space between surfaces 38 of bearing pin 24 and 56 of roller 12. Some of the air-oil mixture flows into the conical space formed between the top 30 of pin 24 and surface 52 of roller 12. The pressurized air-oil mixture is allowed to eventually "leak" out of the conically shaped bearing between the top surface 68 of the annular flange 28 of pin 24 and the lower surface 70 of roller 12.

Roller 12 may be provided with a series of circumferentially spaced air pockets 72 formed in one or both surfaces of roller 12 to provide means to pre-spin roller 12 when no material is passing through the mill. Suitable air ducts are formed in base 10 to cause compressed air to impinge on pockets 72 of roller 12.

Figure 3:
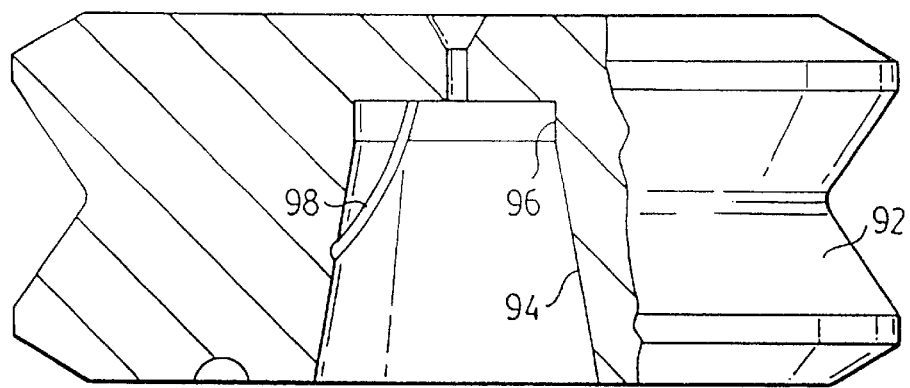
FIG. 3 is a view of one of the guide rollers that fits on the post of FIG. 2.

FIG. 3 shows a variation in the roller 12 of FIG. 1. Here a roller 92 is provided with a frusto-conically shaped recess 94 which terminates in a cylindrical surface 96 at the top of the surface. A series of oil grooves 98 are formed in the surface of recess 94 to assist in the transportation of pressurized oil into the pin-roller bearing interface. The stationary pin to which roller 92 is fitted is of a similar shape to the surfaces of recesses 94 and 96 so as to mate in a manner similar to that shown for roller 12 and pin 24 of FIG. 1.

Figure 4:
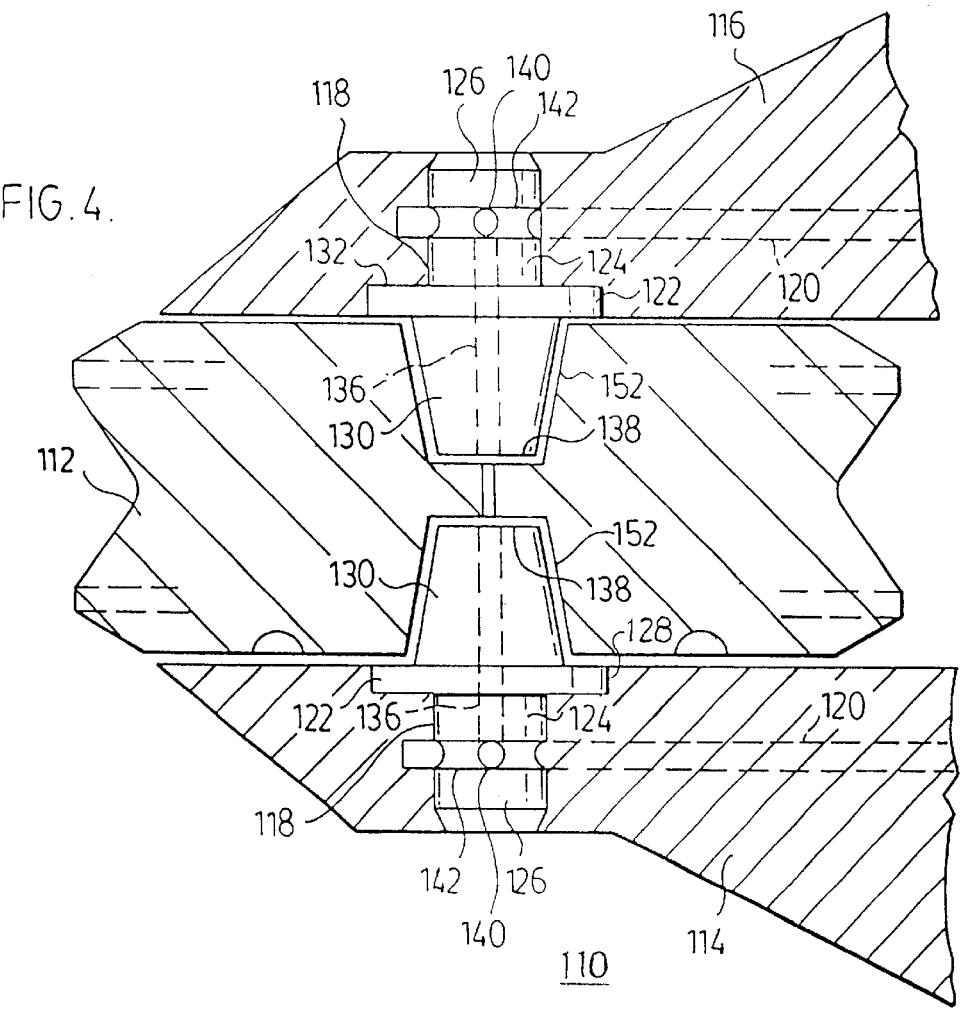
FIG. 4 shows an alternate form of this invention.

FIG. 4 shows an alternate view of the invention. A guide 110 (partially shown) houses a roller 112 between a pair of jaws 114 and 116 which are provided with aligned bores 118. Each of the bores 118 is provided with an annular recess 122 at the surfaces of jaws 114 and 116 adjacent roller 112.

Two hollow bearing pins 124 are mounted in bores 118 of the top and bottom jaws 116 and 114 respectively. As previously, pins 124 are fabricated from a very hard material such as tungsten carbide. Pins 124 are shaped similarly to pin 24 of FIG. 1, that is each pin 124 has a stub 126 to be received in jaws 114 and 116. Each pin has an annular projection 128 to fit into recesses 122 in an interference fit.

Pins 124 are received in jaws 114 and 116 in an interference fit as previously.

The two frusto-conical cavities 152 of rollers 112 terminate in a pair of flat circular surfaces 156.

Rollers 112 thus mate with pin 124 on the frusto-conical surfaces on portion 130. As previously, each pins 124 is provided with a bore 136 which passes from surfaces 138 to oil groove 142. Bores 140 intersect grooves 142 and bores 136 to provide a path from oil galleries 120 in jaws 114 and 116 to the circular surfaces 138 of pins 124. Lubrication is provided by providing an air-oil mixture under pressure in galleries 120 of the jaws 114 and 116. The air-oil mixture flows through grooves 142 into bores 140, thence through bores 136 to surfaces 138 of bearing pins 124 when a lubricating film is formed between the bearing pins 124 and roller 112.

Adjustment of the spacing of jaws must be provided for to achieve stability of the hydrodynamic film between the stationary pins 124 and roller 112. As previously, pockets may be provided in the surface of roller 112 to provide a reaction surface to produce pre-spin of roller 112 before the material being guided has arrived at guide 110.

The material used in roller 112 is the same as roller 12 previously described.

In modem mills, the exit speeds of the moving material through the final rolling stage may be such as to cause rollers 12 to rotate at about 50–60,000 rpm. The forces applied to the moving material by these rollers are constant and at times severe.

To sustain long life pins 24 are fabricated tungsten carbide.

Rollers 12 are preferably formed from a ceramic material to provide long life during operation. It will be obvious to those skilled in the art that the absence of any roller or ball bearing in applicant's rollers provides a roller of superior strength due to the increase in material in the walls of the bearing members. In prior art rollers, a substantial portion of the material surrounding the surface 52 must be removed to provide space for the inclusion of an anti-friction bearing.

In general, the guide of this invention is extremely rugged with very few moving parts and appropriately suited for operation in a hostile environment. Rollers 12 and 112 are capable of rotating continuously at very high speeds with very little demand for maintenance.

A air-oil mixture well known to those skilled in the art, will function satisfactorily to achieve an acceptable lubricating oil film between the roller surface and the bearing surface of the stationary bearing pins. The angle of the frusto-conical surfaces is not critical but should be maintained at about 10°.

While alternative bearing configurations will become apparent to those skilled in the art, applicant prefers to limit the scope of this invention by the following claims.

What is claimed is:

1. A roller for a steel mill guide having the general shape of a hockey puck, said roller having a work engaging peripheral surface of a predetermined shape extending between a pair of substantially flat opposing circular faces, at least one of said flat faces having an axial frusto-conical cavity extending therefrom into said roller toward the opposing face, said cavity being connected to said opposing face of said roller by means of an axial bore, said roller having a symmetrical depression formed in said opposing face at the intersection of said bore.

2. A roller as described in claim 1 where the work engaging surface is a ceramic material.

3. A roller as claimed in claim 1 wherein each circular flat face is provided with a cavity of a frusto-conical shape.

4. A roller as claimed in claim 1 wherein one end of said frusto-conical cavity is shaped to form a cylinder surface.

5. A roller as claimed in claim 1 where a series of curved grooves are provided in said cavity to assist circulation of a lubricant.

6. A bearing pin for a roller of a steel mill guide comprising an elongated member having an exterior shape of a surface of revolution comprising a base portion suitable for mounting in a steel mill guide, and a frusto-conically shaped bearing portion extending axially from said base portion to mate with a roller having a cavity having the same frusto-conical shape, said base having lubricant admission means in communication with an axial bore extending from said lubrication admission means through said bearing portion of said bearing pin.

7. A bearing pin as claimed in claim 6 which is composed of tungsten carbide.

8. A guide for a steel mill comprising a housing for mounting a pair of guide rollers in a predetermined orientation within said housing, each guide roller being of the shape of a hockey puck and being provided with at least one frusto-conically shaped cavity extending from a flat surface inwardly along a central axis of each roller, at least one stationary guide bearing pin for said roller being mounted in said housing having a mating frusto-conically shaped exterior surface to mate with said cavity in said roller so as to form a previously specified space therebetween, means to introduce a film of a preselected lubricant into said space between the cavity and said guide bearing pin to form a hydrostatic bearing.

9. A guide for a steel mill as claimed in claim 8 wherein each guide roller is provided with two frusto-conically shaped cavities in opposing flat faces of said roller.

10. A guide as claimed in claim 8 wherein each guide bearing pin is provided with a central passage to permit flow of said preselected lubricant through said guide bearing pin and into said space.

\* \* \* \* \*